No. 757,066. PATENTED APR. 12, 1904.
M. SOBLIK.
PNEUMATIC TYPE WRITER WITH OPEN PIPE SYSTEM.
APPLICATION FILED OCT. 29, 1902.
NO MODEL.
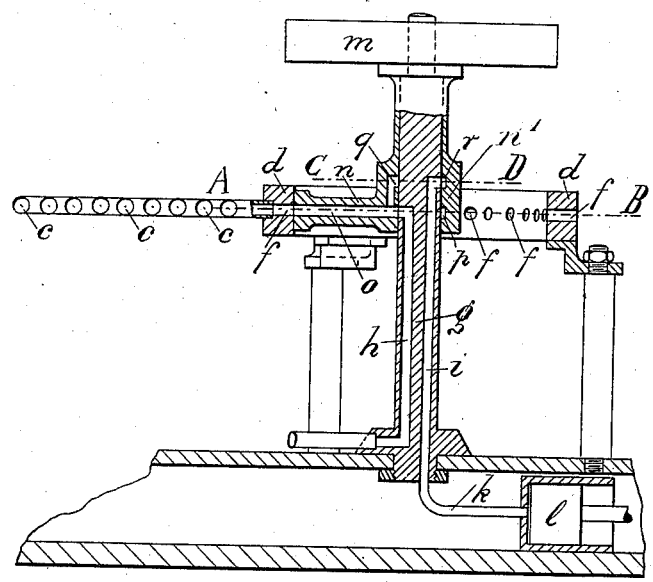
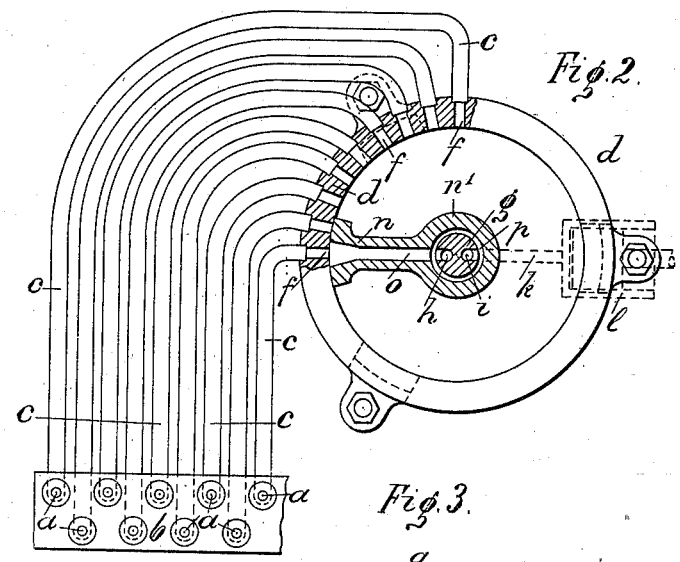
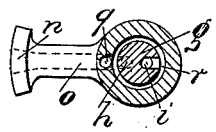
Witnesses:
William Schulz
Edward Oay
Inventor
Maximilian Soblik
by his attorneys
Roeder & Briesen No. 757,066.

Patented April 12, 1904.

UNITED STATES PATENT OFFICE.

MAXIMILIAN SOBLIK, OF DUSSELDORF, GERMANY.

PNEUMATIC TYPE-WRITER WITH OPEN-PIPE SYSTEM.

SPECIFICATION forming part of Letters Patent No. 757,066, dated April 12, 1904.

Application filed October 29, 1902. Serial No. 129,188. (No model.)

*To all whom it may concern:*

Be it known that I, MAXIMILIAN SOBLIK, a subject of the King of Prussia, German Emperor, residing at Dusseldorf, Germany, have invented certain new and useful Improvements in Pneumatic Type-Writers with Open-Pipe Systems, of which the following is a specification.

This invention relates to improvements on the pneumatic type-writer for which Patent No. 659,703 has been granted to me on the 16th day of October, 1900. The type-writer described in said patent is so constructed that immediately after an air-pipe has been closed by the finger the pressure increases within the pipe, while by the present invention the pressure increases when a rotating arm comes into alinement with the air-pipe. By the use of this rotating arm all or a considerable number of the pipes may be connected to a common compressed-air cylinder, while in the aforementioned patent each pipe of the system requires its separate cylinder. The new construction has the further advantage that the consumption of compressed air is reduced to a minimum because the air can escape through one pipe only at a time.

In the accompanying drawings, Figure 1 is a vertical section of a portion of a type-writer embodying my invention; Fig. 2, a horizontal section on line A B, Fig. 1; and Fig. 3, a horizontal section on line C D, Fig. 1.

The letters $b$ represent the keys of a type-writer, having perforations $a$, each perforation communicating by a pipe $c$ with a radial bore $f$ of a ring $d$. This ring is arranged concentric around a stationary axle $g$, having two longitudinal air-ducts $h$ and $i$. The duct $h$ communicates with a compressed air or gas reservoir, (not shown,) while duct $i$ is connected to a compressed-air cylinder $l$ by pipe $k$. The axle $g$ is embraced by the air-tight hub $n'$ of a radial perforated arm $n$, which is connected to the type-wheel $m$ and impinges with its outer end against the inner face of ring $d$, in alinement with perforations $f$. At its inner end the bore $o$ of arm $n$ communicates by an annular groove $p$ of hub $n'$ with duct $h$ of axle $g$. The bore $o$ likewise communicates by branch $q$ and a second annular groove $r$ of hub $n'$ with duct $i$.

In use the type-wheel $m$ is rotated by suitable means. During this rotation the compressed air or gas from the gas-reservoir passes through duct $h$, groove $p$, perforation $o$, and that opening $f$ and pipe $c$ which at this moment communicates with perforation $o$. If one of the openings $a$ is closed by the finger, the pressure in the respective pipe $c$ will increase as soon as the perforation $o$ of arm $n$ arrives opposite said pipe. The increased pressure is transmitted by branch $q$, groove $r$, duct $i$, and pipe $k$ to the cylinder $l$, the piston of which operates the mechanism for printing, moving the carriage, and so on.

The above construction possesses the advantage that a vacuum may be used instead of compressed air. In this case a rarefication will take place in perforation $o$, grooves $q$ and $r$, ducts $i$ and $k$, and cylinder $l$ as soon as arm $n$ passes pipe $c$, the key $b$ of which has been closed. By using a vacuum it is possible to reduce the size of the cylinder, and in this way the type-writer may be made smaller and lighter.

I claim—

1. In a type-writer, a series of perforated keys, a perforated ring connected thereto, a rotatable hollow arm movable along the surface of said ring, a pair of air-ducts, and means on said arm for connecting said air-ducts, substantially as specified.

2. In a type-writer, a series of perforated keys, a perforated ring connected thereto, a rotatable hollow arm, movable along the inner surface of the ring, and an axle having a pair of air-ducts and embraced by the arm, substantially as specified.

Signed at Dusseldorf, Germany, this 13th day of October, A. D. 1902.

MAXIMILIAN SOBLIK.

Witnesses:
 RUDOLF DEUS,
 WOLF EIKER.